United States Patent

[19]

Fan

[11] Patent Number: 5,857,691

[45] Date of Patent: Jan. 12, 1999

[54] BICYCLE SHOCK ABSORPTION STRUCTURE

[76] Inventor: Jeeng-Neng Fan, No. 34, Alley 10, Lane 54, Sec. 2, Yangsin Rd., Yangmei, Taoyuan, Taiwan

[21] Appl. No.: 792,852

[22] Filed: Jan. 23, 1997

[51] Int. Cl.⁶ .................................................. B62K 19/30
[52] U.S. Cl. ........................... 280/283; 280/275; 280/220
[58] Field of Search ................................. 280/281.1, 283, 280/274, 275, 220, 226.1, 227; 297/208, 209

[56] References Cited

U.S. PATENT DOCUMENTS

| 490,587 | 1/1893 | McHardy | 280/227 |
|---|---|---|---|
| 589,328 | 8/1897 | Barton | 280/227 |
| 589,394 | 8/1897 | Ohlgart | 280/227 |
| 602,354 | 4/1898 | Ohlgart | 280/227 |
| 740,554 | 10/1903 | Guiley et al. | 280/227 |

FOREIGN PATENT DOCUMENTS

| 22447 | 10/1896 | United Kingdom | 280/227 |
|---|---|---|---|
| 13120 | 6/1897 | United Kingdom | 280/227 |
| 13350 | 9/1900 | United Kingdom | 280/227 |
| 20022 | 11/1997 | United Kingdom | 280/227 |

*Primary Examiner*—Brian L. Johnson
*Assistant Examiner*—Gary Savitt
*Attorney, Agent, or Firm*—Rosenberg, Klein & Bilker

[57] ABSTRACT

A kind of improved bicycle shock absorption structure, specifically referring to a kind of improved bicycle shock absorption structure featuring a unitary configuration of the bicycle crankset with rider's saddle of the seat cluster that, furthermore, provides direct elastic characteristics upward and downward during operation. Utilizing the force of human physical weight and pedaling power, whenever the wheels are subjected to impact, the unified structure automatically responds by absorbing the shock by elastically rising and falling, the obvious shock absorption effects of which are not only immediately apparent to the rider while seated or standing, but the bicycle does not lose speed, the bicycle frame does not flex and forceful brake application does not adversely affect the effective performance of the shock absorption structure. Most significantly, the advantages offered by the invention includes the retaining of a unified design for the bicycle frame so that there is no front or rear wheel wobble, no adverse effect on power transmission system during shock absorption operation, and a luggage rack can be securely and easily installed over the rear wheel.

1 Claim, 8 Drawing Sheets

BICYCLE SHOCK ABSORPTION STRUCTURE

BACKGROUND OF THE INVENTION

Although there are numerous kinds of bicycle shock absorber devices, most can be classed into the two main categories as transmission system-related and non-transmission system related. Of these, the so-called non-transmission system related variety mainly consists of systems installed on the front end of a bicycle frame, such as on the front fork, handle bar, stem and seat post, which are directly installed and have an integrated resilient component (such as a coil spring, leaf spring or elastomer, etc.). Since this type of installation is does not directly connected to the transmission system, they are simpler and less complex and of course the shock absorption characteristics are mainly focused on the hands of the rider and provide no benefits to the body of the rider. Furthermore, the so-called transmission system-related variety mainly consists of rear stays (such as the seat stays and chain stays in which the rear wheel is mounted) that are not fixed, but active installations equipped with a shock absorber that provides effective shock absorption characteristics for the body of the bicycle rider. In terms of shock absorption performance, the aforesaid variety is further divided into the three categories of low pivot point shock absorption systems, high pivot point shock absorption systems and linked axle-type shock absorption systems, with each category having several dozen variations of respective shock absorption devices. The aforesaid low pivot point shock absorption system refers to a pivot point at the rear wheel that is resilient in upward and downward movement and is positioned below the center line of the front and rear wheels. As indicated in FIG. 1, the shock absorber (30) is installed in between the seat stays (11) and the top tube (13), and the chain stays (12), in addition to having one end conjoined to the lower end of the seat stays (11), the other end is below the center line (C) of the front wheel (A) and the rear wheel (B), with the active installation near the bottom bracket (14), which enables, when the rear wheel (B) subjected to impact, the providing of a resilient upward and downward movement of the pivot point (M) to achieve effective shock absorption. This type of structure can be said to be structurally simpler, lighter in weight and results in reduced chain stretch during shock absorption operation, and although having the advantage of less effect on the transmission system, when the rear wheel is subjected to impact, the locus of wheel movement tends to be upward and forward, which produces a loss of wheel traction. Furthermore, the bicycle frame flexes when large physical objects are encountered. Since the aforesaid structure provides for rear wheel mounting at the seat stays and chain stays, and is not a solidly anchored active installation, whether riding or during brake application, wobbling readily occurs in the aforesaid rear wheel (wheel wobble increases in direct proportion to the assembly clearances of the seat stays and chain stays), and during braking operation, the braking force increases the shock absorber pressure, which decreases shock absorption efficiency and affects structural integrity. In the high pivot point shock absorption system, as indicated in FIG. 2, the middle of the high pivot point (M) is above the center horizontal line (C) of the rear wheel (B). With this type of structure, since the pivot point is positioned over the center horizontal line of the rear wheel, therefore, after shock absorption, the rear wheel moves rearward and is capable of automatically producing a horizontal shock absorption effect. As a result, when the rear wheel is impacted, reduction in bicycle speed is minimal and the bicycle rider feels less impact. However, the chain stretch tension increases considerably and pedal rebound force becomes greater, which produces adverse effects on the transmission system, and the aforesaid pedal rebound force is directly transferred to the bicycle rider, with the shortcoming of creating discomfort to the bicycle rider. Naturally, since the seat stays (11) and the chain stays (12) are both active installations, therefore, the aforementioned wobble produced by the rear wheel as well as the increased shock absorber (30) pressure from the application of bicycle braking force cannot be improved upon. Furthermore, the linked axle-type shock absorption system, as indicated in FIG. 3, is a high pivot point design with the pivot point (M) located above the center horizontal line (C) of the rear wheel (B). However, the aforesaid bottom bracket (14) is designed to move together with the rear wheel (B) and since the aforesaid bottom bracket moves with the rear wheel, therefore, during shock absorption, the advantages are that the effect on the transmission system is lessened and there is no pedal rebound. However, due to the simultaneous movement design of the bottom bracket and the rear wheel, the bicycle rider enjoys the shock absorption performance when riding in a seated position, but all shocks due to ground surface irregularities are transmitted to the rider when riding in the standing position, thereby resulting in periods when all shock absorption characteristics are predictably absent. Furthermore, during shock absorption operation while riding in the standing position, the feet are continuously subjected to shock from the ground surface, which adversely affects the comfort of the rider. Naturally, since the seat stays and the chain stays (12) are active installations, therefore, wobbling occurs in the aforesaid rear wheel and the force of brake application increases shock absorber (30) pressure, both of which cannot be overcome. In other words, although the three shock absorption systems consisting of the aforesaid low pivot point, high pivot point and linked axle-type each have the advantage of being usable, each type has several shortcomings. To the user, this obviously presents certain advantages and inconveniences in application. Furthermore, during the shock absorption operation of each type, the aforesaid rear wheel moves upward and downward and, therefore, conventional baggage racks that are mounted over the rear wheel cannot be installed or cushioned by the shock absorption structure.

Of course, in the meanwhile manufacturers have provided resilient component shock absorbers installed at the seat post of saddles such that during shock absorption, the aforesaid rear wheel cannot move upward and downward, thereby improving upon the shortcomings of the aforesaid transmission system effects as well as the inability to install baggage racks. However, the structure is still completely ineffective when riding in the standing position and, furthermore, although the saddle moves upward and downward while riding in the seated position, the pedals are incapable of a matching upward and downward movement, of which the resulting shortcoming is discomfort to the feet of the bicycle rider.

In summation, the foregoing description conveys the knowledge that the aforementioned structure of the conventional bicycle shock absorption devices obviously still have a number of utilization shortcomings that can be improved.

SUMMARY OF THE INVENTION

Therefore, the primary objective of the invention herein is to provide a kind of improved bicycle shock absorption structure, wherein the crankset and the seat cluster are integrated into a single unit and, furthermore, is capable of elastic ascending and descending performance, and since the invention herein is not rigidly integrated to the bicycle frame, therefore, when the bicycle tires are subjected to impacts that produces shock in the bicycle frame, the body of the bicycle rider is not subjected to any direct impact whether riding in a standing or seated position due to the shock absorption effectiveness of the bicycle frame.

Another objective of the invention herein to provide a kind of improved bicycle shock absorption structure, wherein the bicycle frame is of a unified structural design such that when the rear wheel is subjected to impact, no upward and downward movement occurs and during the shock absorption process, the bicycle does not lose speed, the bicycle frame does not flex, the rear wheel does not wobble and the functioning of the transmission system remains unaffected. At the same time, the aforesaid force of brake application does not directly affect the shock abortion component by increasing the load of the shock absorption structure, while the aforesaid baggage rack can be firmly and easily installed over the rear wheel without affecting shock absorption efficiency.

Yet another objective of the invention herein to provide a kind of improved bicycle shock absorption structure, wherein connecting arm components are installed between the axle of the crankset and the axle of the rear wheel such that the crankset is not only maintained in the proper position, but during the shock absorption process when the crankset ascends and descends, the connecting arms operate within the movement radius of the crankset to prevent increases in chain stretch tension, the production of rebound at the pedals and adverse effects on the transmission system.

To enable the examination committee to further understand the objectives, innovations and performance of the invention herein, the brief description of the drawings is followed by the detailed description of the invention herein.

DETAILED DESCRIPTION OF THE INVENTION

Figure 1:
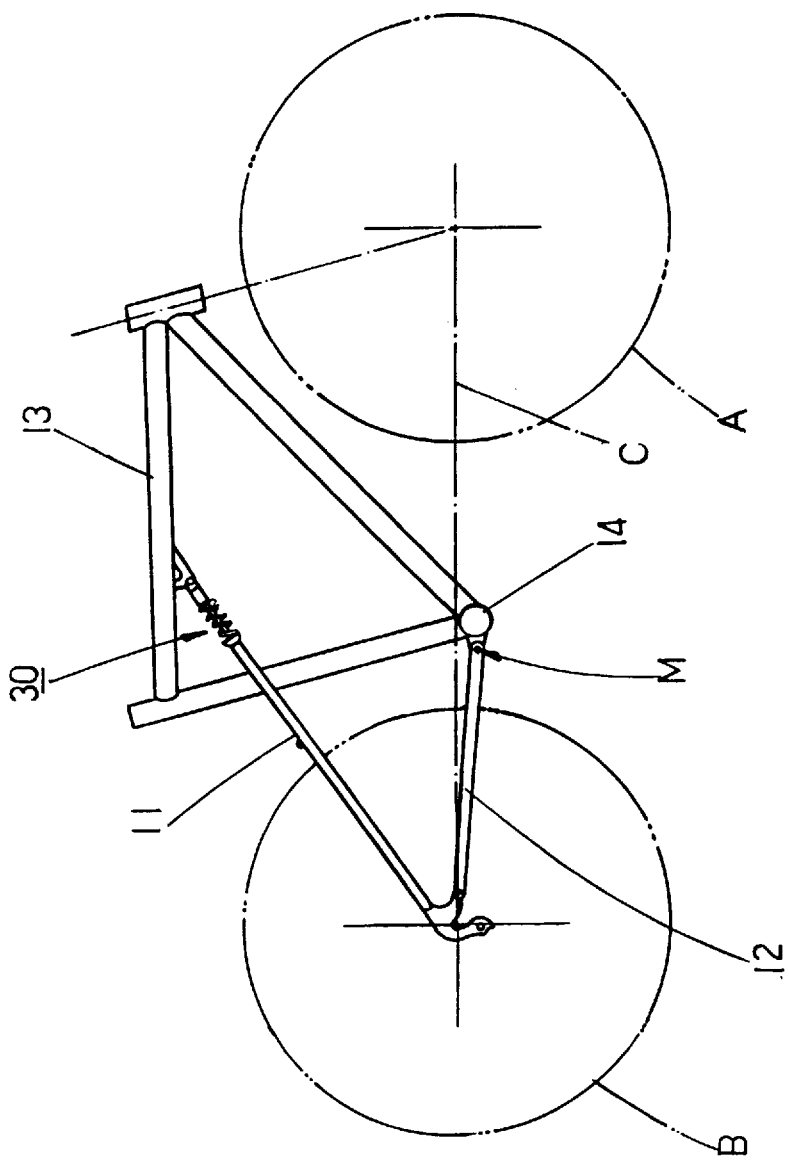
FIG. 1, FIG. 2 and FIG. 3 are orthographic drawings of conventional bicycle shock absorber devices.

Referring first to FIG. 4, FIG. 5, FIG. 6 and FIG. 7, and as clearly indicated therein, the invention herein is an improved bicycle shock absorption structure that mainly consists of providing the rider with a seat cluster (40) and a movable crankset (50) integrated into a single unit and, furthermore, that slides up and down. The shock absorption structure (30) of the invention herein includes an outer tube (301) that is positioned around the lower extent of the seat cluster (40), and welded to the top tube (10) and the seat stays (11) and, furthermore, is firmly maintained in position by the seat tube (15) welded to the down tube (16), while the inner diameter of the top and the bottom ends have the respective threads (3011) and (3012) of a suitable depth; an adjustment sleeve (302) that is screwed into the threads (3011) inside the outer tube (301) and is secured by a lock nut (D) onto the positioning ring (3021) protruding into the inner diameter of the top end; a ⊥ shaped shock absorber tube (303) that is inserted upwards into the outer tube (301) and replaces the conventional seat tube, with a horizontal sleeve (3031) affixed to the lower end that replaces the conventional bottom bracket and which has a small length of positive threads (3032) at the center section, while the top end provides for the insertion of the seat post (402) of the saddle (401) comprising the seat cluster (40) that is secured in position by an annular binder (403); a resilient shock absorber component (304) that can be a spring, elastomer or other elastic body and which is positioned inside the outer tube (301) inserted into the shock absorber tube (303), with the lower end situated against the positioning ring (3021) of the adjustment sleeve (302); a positioner nut (305) that is T-shaped and screwed onto the positive threads (3032) at the approximate center section of the shock absorber tube (303) and which keeps the top end of the resilient shock absorber component (304) at a set position, enabling the shock absorber tube (303) to move elastically up and down; an upper stop point resilient component (306) that can be a spring, elastomer or other elastic body and which is sleeved onto the shock absorber tube (303), with the lower end held against the surface at the upper end of the positioner nut (305); a lower stop point resilient component (307) that can be an elastomer, spring or other elastic body that is inserted into the shock absorber tube (303) and positioned over the upper stop point resilient component (306), with a recessed annular groove (3071) at the top end providing for a lock nut (3072) which is screwed into the threads (3011) inside the upper end of the outer tube (301); two connecting arms (308) and (308'), the forward ends of which are respectively conjoined to the two sides of the horizontal sleeve (3031) at the lower end of the shock absorber tube (303), while the other ends are respectively conjoined to the two sides of the axle (b) at the center of the rear wheel (B), of which there is a tubular sleeve (3081') protruding laterally from one end of the connecting arm (308') that is inserted into the horizontal sleeve (3031) at the lower end of the shock absorber tube (303) and, furthermore, provides for the placement of the guide hole (3085) at the end of the other connecting arm (308), and the inner diameter (3082') is the same as that of a conventional bottom bracket to accommodate the installation of the axle (501), the bearing retainers (502), the threaded mounting cups (503) and other crankset (50) components, with one side of the threaded mounting cups (503) providing for the screwing on of a lockring (504) and the fastening of the connecting arm (308'), and situated nearby is an anchor bolt (3083') that is fastened with a nut (E) after insertion into the through hole (3086) in the other connecting arm (308), thereby providing for the secure mounting of the two connecting arms (308) and (308'), with the other ends of the aforesaid two connecting arms (308) and (308') each having the respective guide holes (3087) and (3087') into which are installed the respective bushings (3088) and (3088') that comprise the means of active insertion and securing at the two sides of the rear wheel (B) axle (b).

Figure 8:
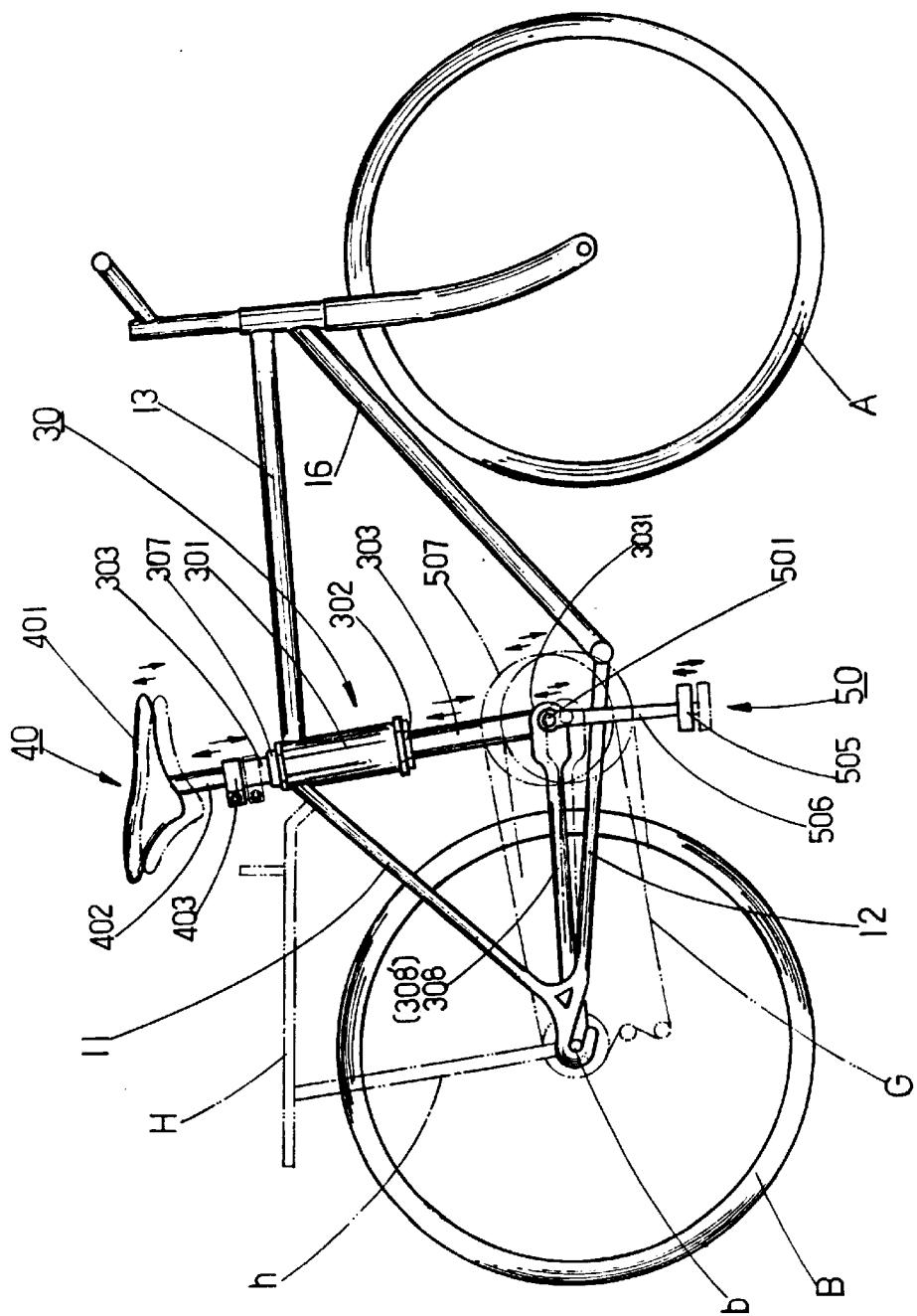
FIG. 8 is an orthographic drawing illustrating the operation of the shock absorption structure of the invention herein.

Utilizing the aforementioned structural components comprising the assembly of the invention herein, as indicated in FIG. 8, since the aforesaid outer tube (301) is welded to the bicycle frame (10) to form a rigid framework, therefore, after the shock absorber tube (303) is inserted into the outer tube (301), the resilient shock absorber component (304) between the adjustment sleeve (302) and the positioner nut (305) inside the outer tube (301) remains movable, directly providing for the installation of the saddle (401) of the seat cluster (40), while the horizontal sleeve (3031) at the lower end directly provides for the installation of the axle (501) of the crankset (50) such that whether the rider is seated on the saddle (401) or standing on the pedals (505), when the bicycle wheels (A) and (B) are subjected to impact (especially in situations wherein most of an adult's physical weight is biased over the rear wheel (B)), the aforesaid adult physical weight bearing directly onto the shock absorber tube (303') naturally results in an upward and downward elastic action that directly lowers and absorbs the force of impact, thereby allowing the seated or standing rider to fully experience the pressure cushioning effect of shock absorption; furthermore, due to the fastening of the positioner nut (305) at the upper extent of the shock absorber tube (303) and the load support provided by the upper stop point resilient component (306), therefore, when the shock absorber tube (303) is in the process of shock absorption and, furthermore, the resilient shock absorber component (304) is rebounding upward, since the aforesaid upper stop point resilient component (306) compresses, as a matter of course, the rebound force of the aforesaid shock absorber tube (303) is limited to a set upper point and thereby effectively damped, allowing the rider postured in the saddle (401) or standing on the pedals (505) to be isolated from rebound pressure up to the limits of the set position and consequently the occurrence of discomfort due to inappropriate decompression due to sudden obstruction; furthermore, since the top end of the outer tube (301) is equipped with a lower stop point resilient component (307), therefore, when the bicycle wheel is subjected to greater magnitudes of impact and the shock absorber tube (303) descends considerably, the annular binder (403) holding the seat post (402) of the saddle (401) can be set to a lower point of initial downward contact relative to the lower stop point resilient component (307) such that no contact is made with the upper end of the outer tube (301) and, as a matter of course, the aforesaid force of descent is immediately cancelled, not only allowing the rider to remain comfortable at all times, but also protecting the resilient shock absorber component (304), which prevents the occurrence of elastic fatigue and the shortening of effective service life; furthermore, since the resilient shock absorber component (304) is contained within the outer tube (301) and secured by the positioning ring (3021) of the adjustment sleeve (302), therefore, if necessary during utilization, the user can adjust the adjustment sleeve (302) at the lower end of the outer tube (301) upward or downward to adjust the tension exerted by resilient shock absorber component (304) against the shock absorber tube (303) to thereby vary the shock absorption elasticity of the shock absorber tube (303).

Figure 2:
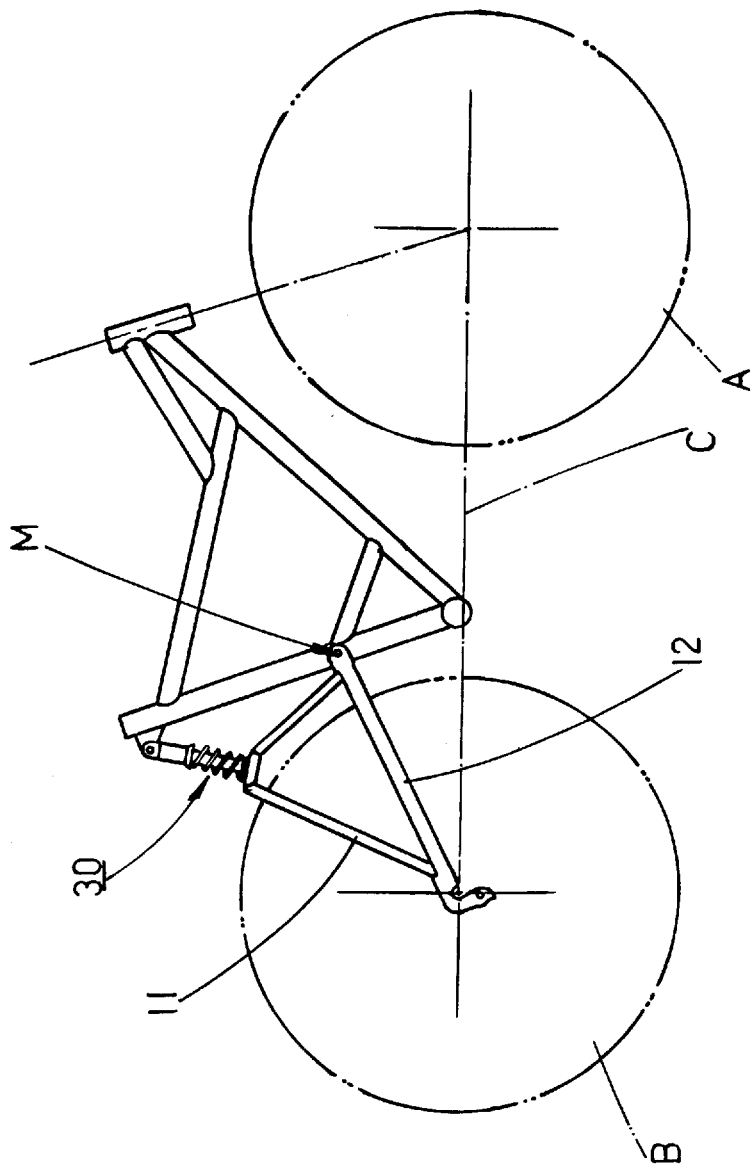
Figure 3:
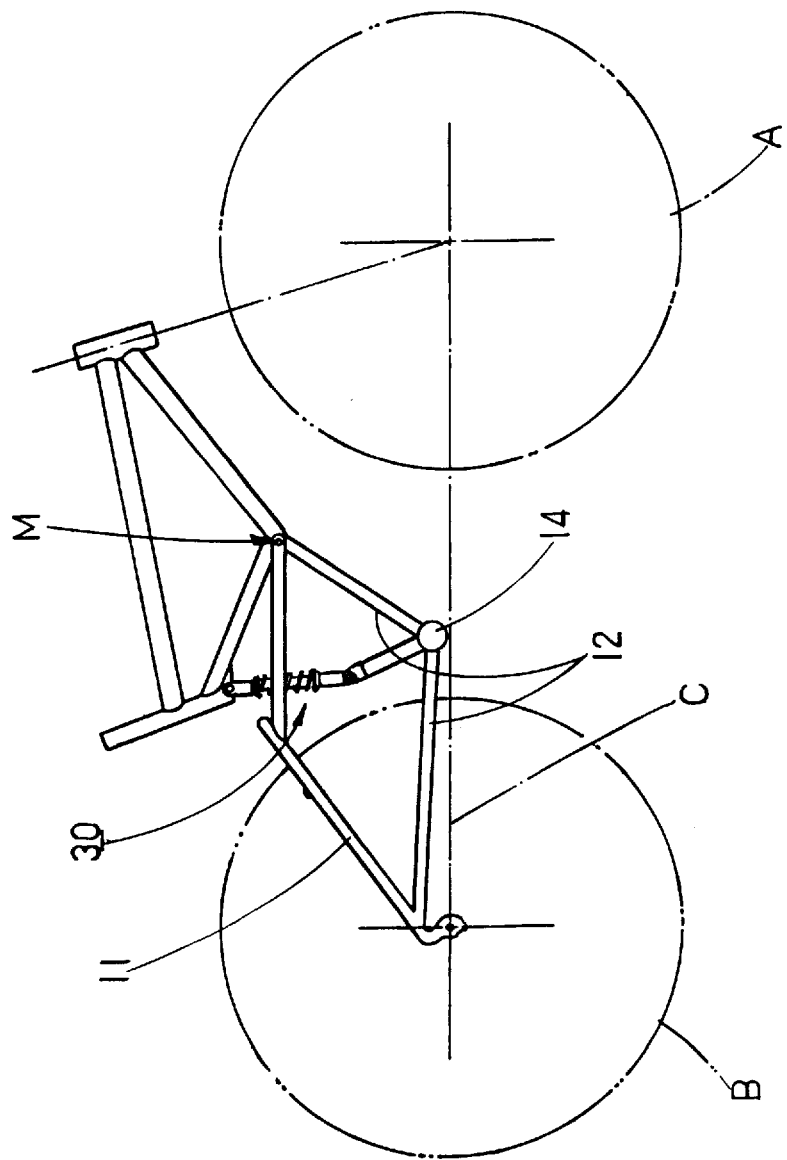
Figure 4:
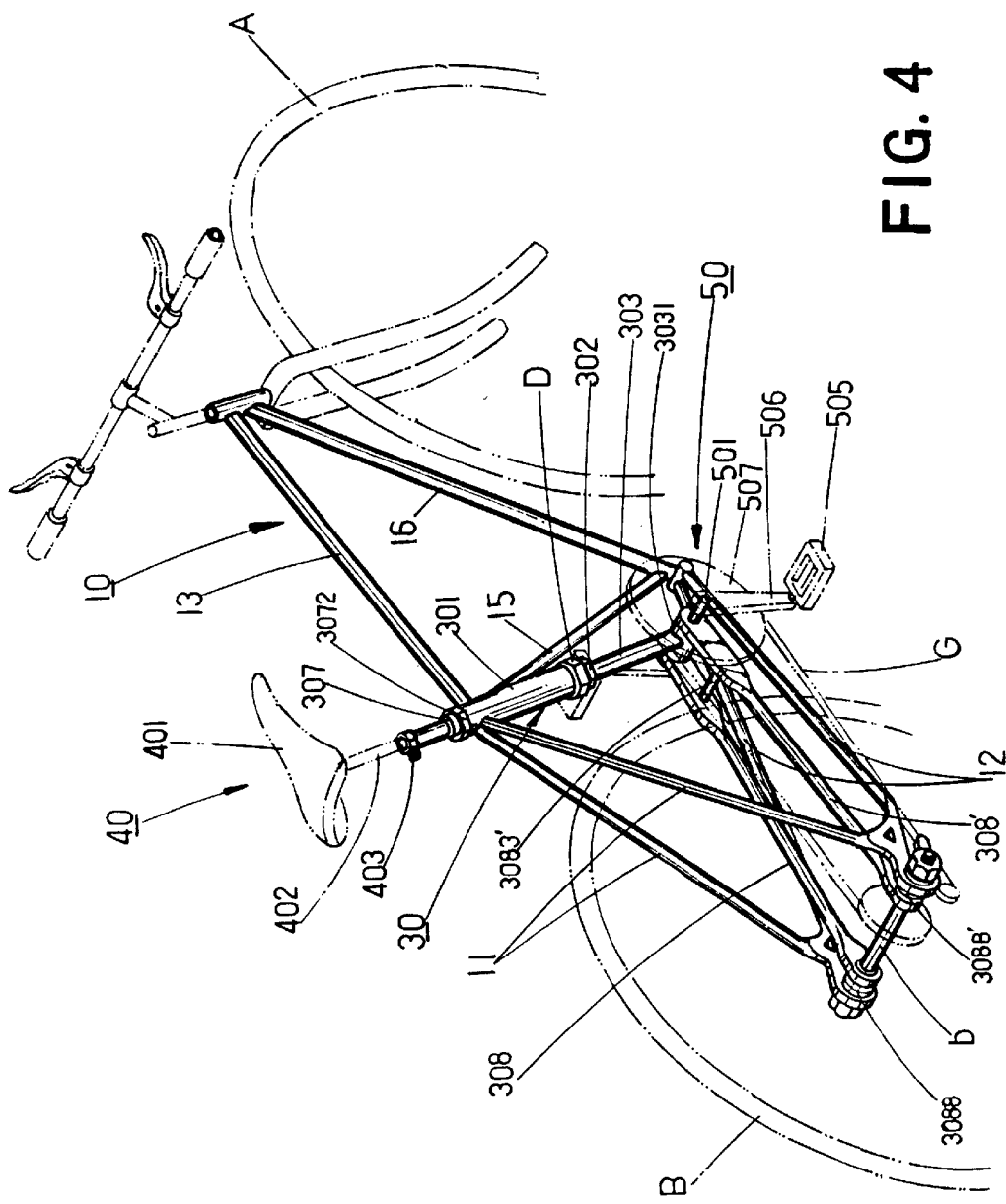
FIG. 4 is an isometric drawing of the invention herein as configured on a fully assembled bicycle.
Figure 5:
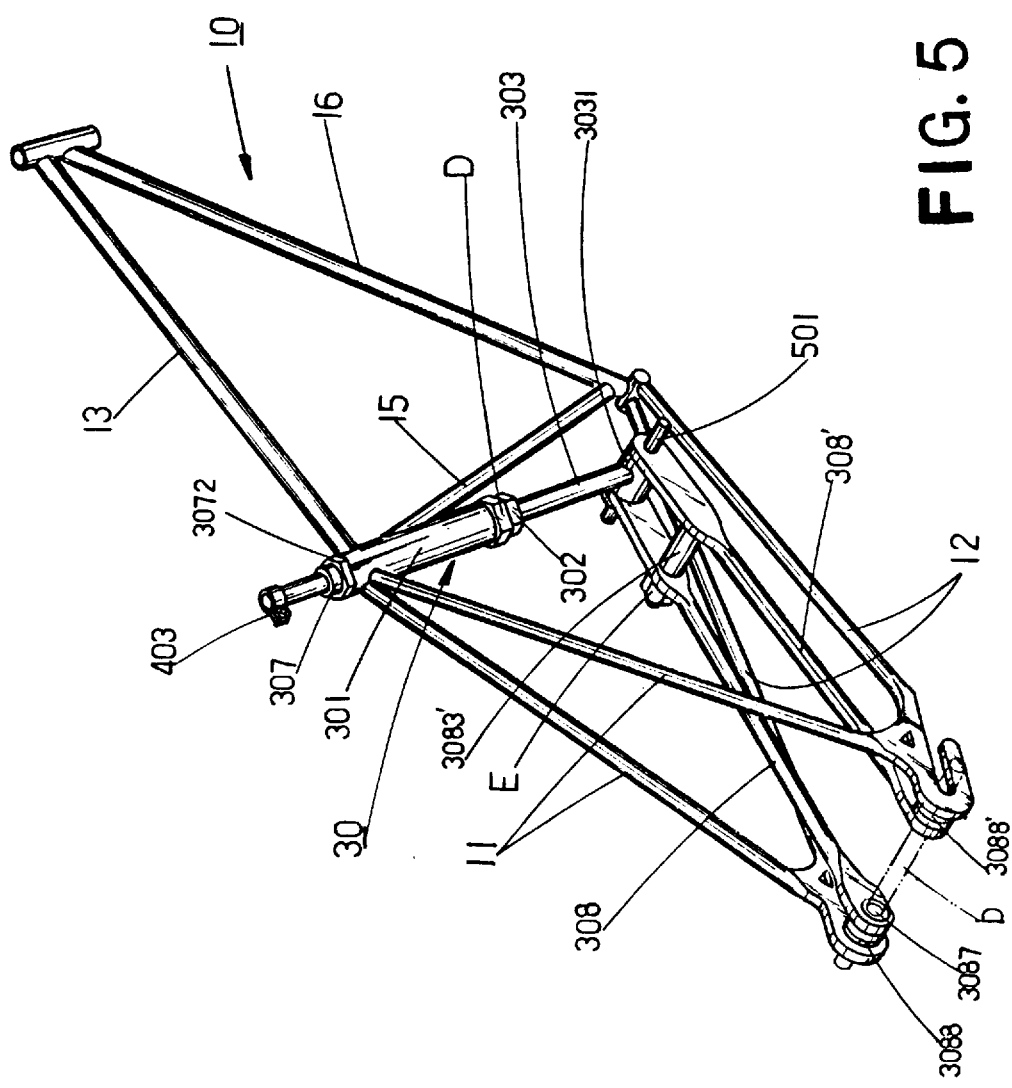
FIG. 5 is an isometric drawing of the invention herein integrated into a bicycle frame.
Figure 6:
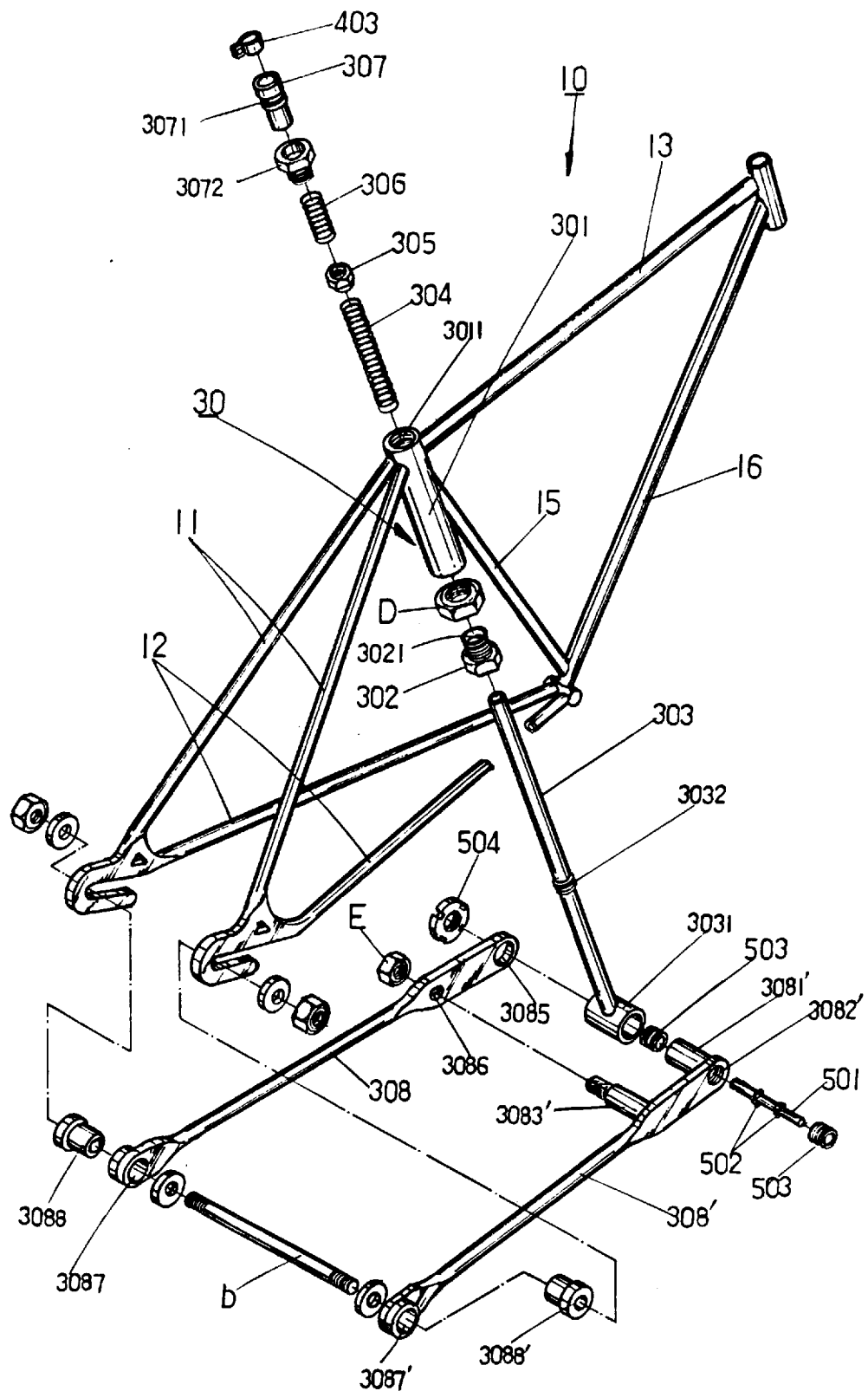
FIG. 6 is an exploded isometric drawing of the invention herein and the bicycle frame, with all the components respectfully positioned in a spatial relationship.

Furthermore, since the aforementioned shock absorber structure (30) of the invention herein is not the same as the conventional system installed at the rear seat stays (11) and the rear chain stays (12), therefore, the invention herein provides rear seat stays (11) and the rear chain stays (12) for mounting the rear wheel (B) that are welded to the top tube (13) and the down tube (16) to form a unified bicycle frame (10), and unlike the case of the conventional pivot point (M) (as indicated in FIG. 1, FIG. 2 and FIG. 3), as a matter of course, the aforesaid rear wheel (B) has no tendency to wobble and at the same time, during the shock absorption process, since the aforesaid rear wheel (B) does not move upward or downward, there are no negative effects on the power transmission system, reduction of bicycle speed and frame flexing as is the case with the conventional systems and, naturally, when the brakes are operated, the applied brake pressure will not adversely influence shock absorber component life or reduce shock absorber efficiency, which are the shortcomings of conventional shock absorber structures.

Figure 7:
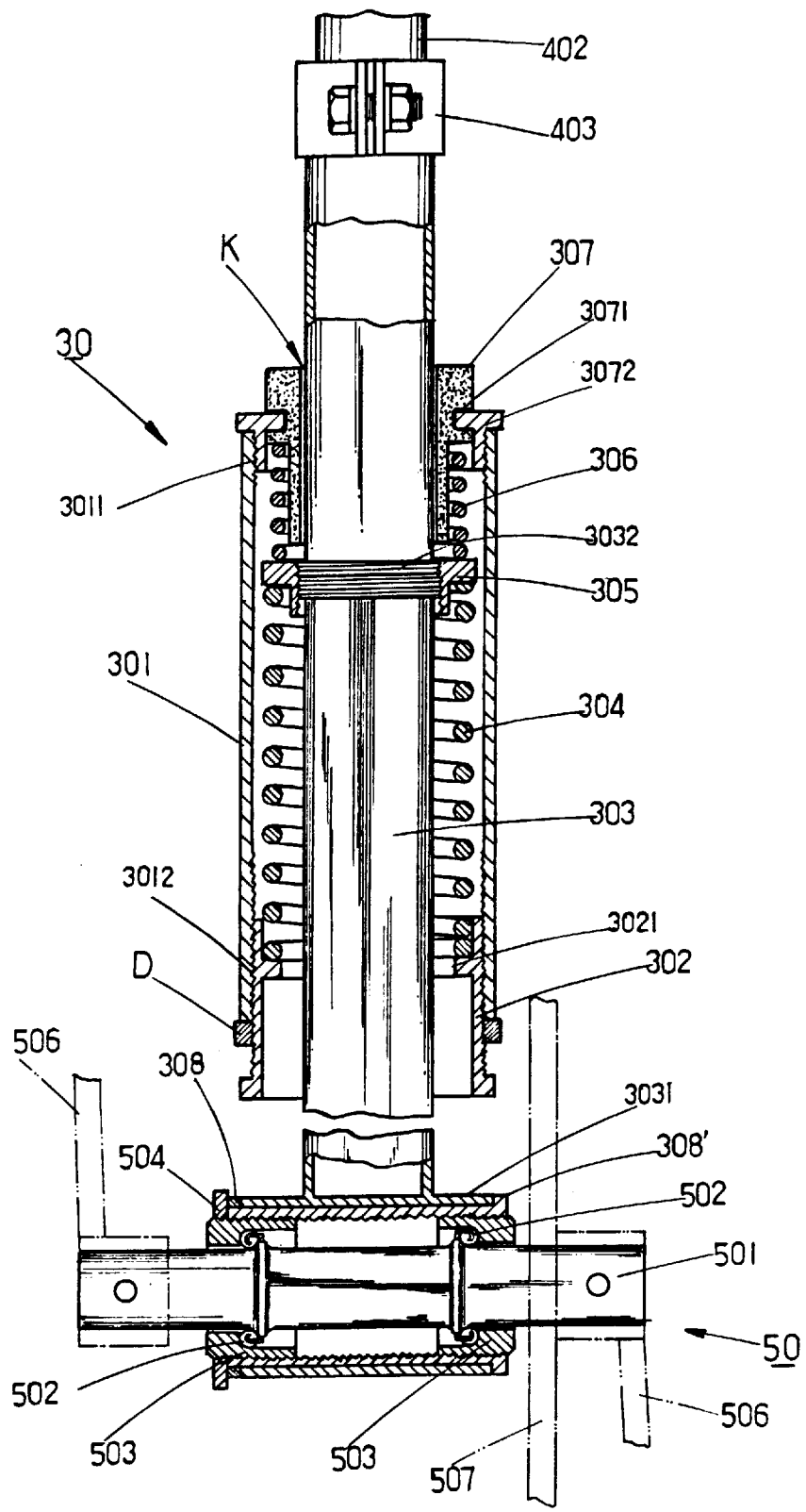
FIG. 7 is cross-sectional drawing of the invention herein showing the seat tube and the crankset-axle assembly.

Furthermore, since the two connecting arms (308) and (308') are attached exactly in between the lower end of the shock absorber tube (303) and the axle (b) of the rear wheel (B), therefore, in addition to the shock absorber tube (303) achieving non-sway stable mounting and benefiting the rider in pedaling the crankset (50), during the shock absorption process, the aforesaid connecting arms (308) and (308') at the axle (b) point of the rear wheel (B) directly provide the shock absorber tube (303) a radius of upward and downward movement, enabling the shock absorber tube (303), whether ascending or descending, to provide a fixed distance between the pedal cranks (506) and the chain wheel (507) of the crankset (50) and the rear wheel axle (b), which remains constant such that the chain (G) of the aforesaid drive system will not stretch under increased load, and the aforesaid pedals (505) will not be affected by drive system rebound; naturally, the operating distance of the aforementioned shock absorber tube (303) is not of extreme length and, furthermore, the interval between the lower stop point resilient component (307) at the upper end of the outer tube (301) consists of an appropriate assembly clearance (K) (as indicated in FIG. 7) and, therefore, when ascending and descending during operation, although a slight angle is produced by the connecting arms (308) and (308') due to conjoinment to the rear wheel axle (b), the normal rising and falling shock absorption characteristics remain unaffected.

Furthermore, as mentioned in the foregoing section, since the installation of the shock absorber structure (30) of the invention herein is unlike the conventional structure in that no pivot point needs to be fabricated for the rear seat stays (11) and the rear chain stays (12), and no rising and falling movement occurs at the rear wheel (B), therefore, the aforementioned baggage rack (H) can be simply installed in a manner similar to that of the conventional variety at the top end of the rear seat stays (11), with the support member (h) at other end mounted to the rear wheel axle (b), enabling the bicycle frame to not only be equipped with a shock absorber structure (30), but at the same time allows the simple and convenient and, furthermore, rapid installation of a baggage rack (H) over the rear wheel without affecting the shock absorption characteristics.

In the foregoing description, an aspect worthy of mention is that since the seat cluster (40) and the crankset (50) is directly mounted to the upper and lower ends of the shock absorber tube (303) in the shock absorber structure (30), therefore, during the shock absorption process, when the aforesaid saddle (401) and the pedals (505) are simultaneously ascending and descending, as a matter of course, assistance, smoothness, comfort are effectively provided to both legs of the bicycle rider with no impeding effects.

What is claimed is:

1. A bicycle and shock absorber structure comprising:
    an outer tube that is positioned around a lower extent of a seat cluster, and welded to a top tube of a bicycle and seat stays thereof to form a unified structure, said outer tube having an inner diameter of a top end and a bottom end, each of said top and bottom ends having respective internal threads formed therein;
    an adjustment sleeve threadedly engaged with said internal threads of said bottom end of said outer tube, said adjustment sleeve being secured by a lock nut and having a positioning ring protruding into an inner bore of said outer tube;

an inverted T-shaped shock absorber tube having a first end that extends upwardly into said inner bore of said outer tube, said shock absorber tube having a horizontal sleeve affixed to a lower end of a vertical section thereof, said vertical section having a short length of externally formed threads at an approximate center section thereof, said vertical section having a top end adapted for receiving and binding of a seat post of a saddle;

a resilient shock absorber component positioned inside of said outer tube and external to said shock absorber tube, said resilient shock absorber component having a lower end disposed against said positioning ring of said adjustment sleeve;

a positioner nut having a T-shaped contour and threadedly engaged with said threads at said top end of said outer tube for maintaining a top end of said resilient shock absorber component at a set position and thereby enabling said shock absorber tube to move elastically up and down;

an upper stop point resilient component which is sleeved onto said shock absorber tube, said upper stop point resilient component having a lower end disposed against an upper surface of said positioner nut;

a lower stop point resilient component that is T-shaped, said lower stop point resilient component being inserted into said shock absorber tube and positioned over a top end of said upper stop point resilient component, said lower stop point resilient component having a recessed annular groove formed in a top end to provide for coupling to a lock nut threadedly engaged with said internal threads of said upper end of said outer tube;

a pair of connecting arms, said pair of connecting arms having respective first ends respectively conjoined through opposing sides of said horizontal sleeves, said pair of connecting arms having second ends respectively conjoined on opposing sides of an axle at a center portion of a rear bicycle wheel, a first of said pair of connecting arms having a tubular sleeve protruding laterally from one end thereof for insertion into said horizontal sleeve, the second of said pair of connecting arms having a guide hole formed therethrough and disposed in aligned relationship with said tubular sleeve for receiving a bicycle's crankset components, said first connecting arm having an anchor bolt adjacent said tubular sleeve that is passed through an opening formed in said second connecting arm and fastened with a nut, thereby providing for a secure mounting of said pair of connecting arms.

* * * * *